(12) United States Patent
Okamoto et al.

(10) Patent No.: US 8,126,322 B2
(45) Date of Patent: Feb. 28, 2012

(54) INTERCHANGEABLE LENS, CAMERA BODY, AND CAMERA SYSTEM

(75) Inventors: Mitsuyoshi Okamoto, Osaka (JP); Koji Shibuno, Osaka (JP); Akihiro Okamoto, Osaka (JP); Takashi Abe, Ehime (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/721,735

(22) Filed: Mar. 11, 2010

(65) Prior Publication Data

US 2010/0232775 A1 Sep. 16, 2010

Related U.S. Application Data

(60) Provisional application No. 61/160,010, filed on Mar. 13, 2009.

(30) Foreign Application Priority Data

Apr. 23, 2009 (JP) ................................. 2009-104966

(51) Int. Cl.
*G03B 17/00* (2006.01)
(52) U.S. Cl. .......................................... 396/81; 359/694
(58) Field of Classification Search .................... 396/81; 359/694
See application file for complete search history.

(56) References Cited

U.S. PATENT DOCUMENTS

| 5,128,769 | A | 7/1992 | Arai et al. |
| 6,683,652 | B1 | 1/2004 | Ohkawara et al. |
| 2007/0019104 | A1 | 1/2007 | Inoue et al. |
| 2007/0104474 | A1* | 5/2007 | Tamura ........................... 396/91 |
| 2008/0030593 | A1 | 2/2008 | Sato |
| 2008/0100730 | A1 | 5/2008 | Tsuda |
| 2008/0165274 | A1 | 7/2008 | Toguchi |
| 2008/0198479 | A1* | 8/2008 | Saito ............................. 359/694 |
| 2008/0199176 | A1 | 8/2008 | Kurosawa |
| 2009/0190910 | A1* | 7/2009 | Yasuda et al. ................. 396/133 |
| 2009/0268038 | A1* | 10/2009 | Matsumoto ................ 348/207.1 |
| 2009/0284612 | A1 | 11/2009 | Abe et al. |

FOREIGN PATENT DOCUMENTS

| JP | 4-280239 | 10/1992 |
| JP | 11-136562 | 5/1999 |
| JP | 2007-043637 | 2/2007 |
| JP | 2008-170508 | 7/2008 |

* cited by examiner

*Primary Examiner* — Clayton E LaBalle
*Assistant Examiner* — Linda B Smith
(74) *Attorney, Agent, or Firm* — Panasonic Patent Center; Dhiren Odedra; Kerry Culpepper

(57) ABSTRACT

An interchangeable lens has a zoom lens, a zoom driver operable to drive the zoom lens along an optical axis, a focus lens, a focus driver operable to drive the focus lens along the optical axis, and a storage unit operable to store link information which links position information indicating a position of the zoom lens on the optical axis with information about a variation in magnification caused by the focus lens advancing and retreating on the optical axis with the zoom lens located at the position indicated by the position information.

7 Claims, 11 Drawing Sheets

| | W ← | | | | | → T | |
|---|---|---|---|---|---|---|---|
| ZOOM POSITION | 0 | 1 | 2 | 3 | 4 | ...... | 31 |
| MAGNIFICATION VARIATION RATIO (%) | 0.2 | 0.18 | 0.15 | 0.13 | 0.12 | ...... | 0.005 |

| ZOOM POSITION | 0 | 1 | 2 | 3 | 4 | …… | 31 |
|---|---|---|---|---|---|---|---|
| MAGNIFICATION VARIATION RATIO (%) | 0.2 | 0.18 | 0.15 | 0.13 | 0.12 | …… | 0.005 |

W ←——→ T

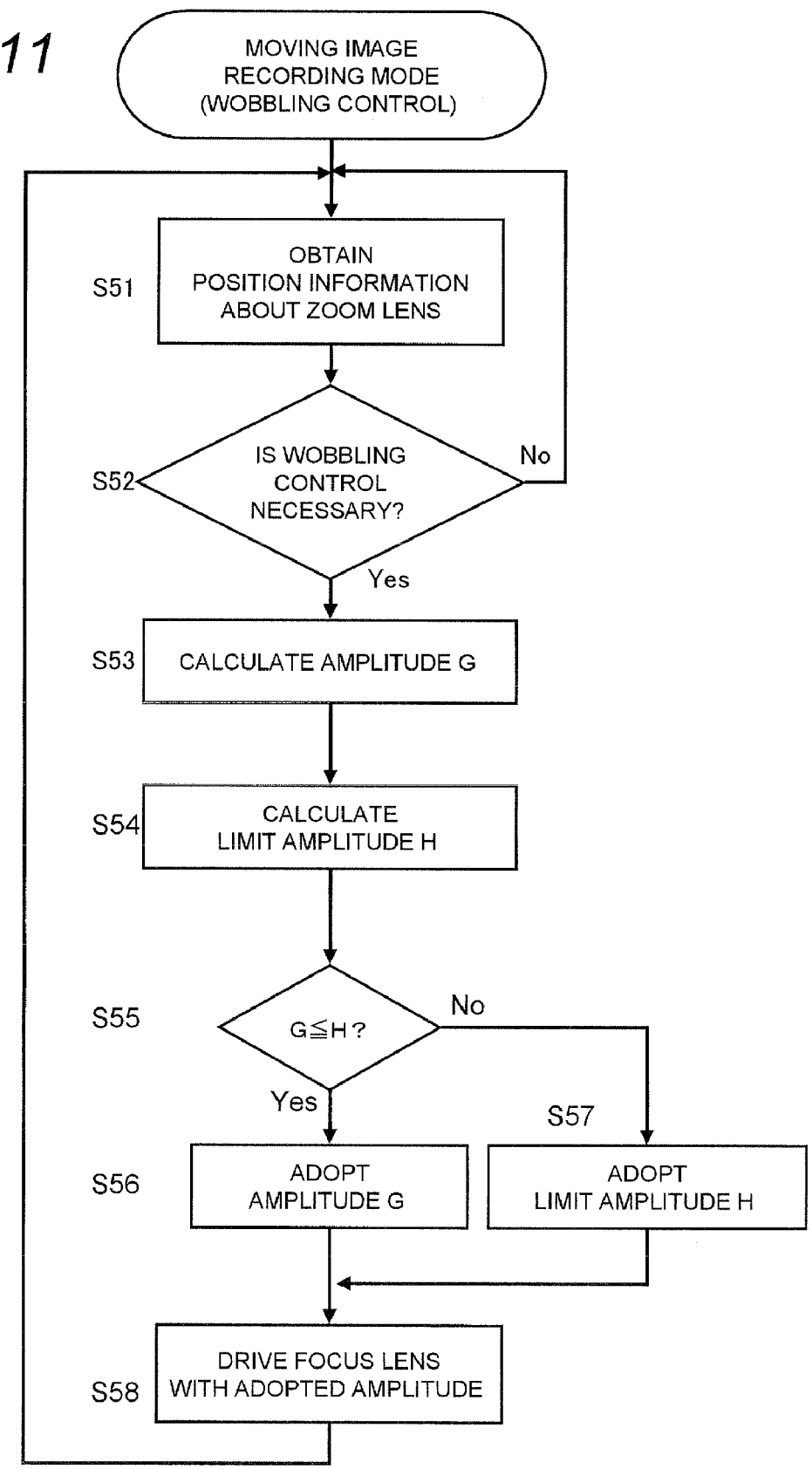

INTERCHANGEABLE LENS, CAMERA BODY, AND CAMERA SYSTEM

BACKGROUND

1. Technical Field

The technical field relates to an interchangeable lens, a camera body, and a camera system, and particularly relates to a camera body which performs autofocus control in recording of moving image, an interchangeable lens compatible with the camera body, and a camera system having the camera body and the interchangeable lens.

2. Related Art

JP-A-4-280239 discloses a camera apparatus of interchangeable lens type having a camera unit and a lens unit detachably mountable to the camera unit. The lens unit has a drive system relating to automatic focus regulation and automatic exposure control. Further, the lens unit has status information about the lens unit. In this camera apparatus, various control information and the status information are communicated between the camera unit and the lens unit, so that the camera unit controls the lens unit.

In order to realize autofocus operation in recording of moving images, wobbling control is performed. In the wobbling control, while a focus lens is being advanced and retreated to an optically axial direction by a very short distance and a focus direction is being detected, the focus lens is moved to a direction of a focus position. Further, in a lens unit having a zoom lens and a focus lens, when the focus lens is moved with a focus state being maintained, accordingly the zoom lens occasionally moves. In such a lens unit, when the above wobbling control is performed, a field angle periodically fluctuates by small oscillation of the focus lens. As the zoom lens is closer to a wide-angle side, the fluctuation becomes more remarkable. Therefore, when the wobbling control is performed during recording of moving images, the field angle of the moving images recorded by the imaging device changes, and thus the images become ugly for users. In the conventional camera apparatuses of interchangeable lens type (for example, the camera apparatus of interchangeable lens type disclosed in the JP-A4-280239), when moving images are recorded, automatic focus regulation cannot suitably performed for every state of the zoom lens, and thus the above problems caused by the wobbling control cannot be solved.

SUMMARY

An object is to provide an interchangeable lens, a camera body and a camera system which can perform automatic focus operation suitably according to a state of a zoom lens when recording moving images.

In order to solve above described problem, an interchangeable lens includes: a zoom lens operable to change a size of a subject image; a zoom driver operable to drive the zoom lens along an optical axis; a focus lens operable to change a focus state of the subject image; a focus driver operable to drive the focus lens along the optical axis; and a storage unit operable to store link information which links position information indicating a position of the zoom lens on the optical axis with information about a variation in magnification caused by the focus lens advancing and retreating on the optical axis.

A camera body to which the above interchangeable lens is mountable, includes: a first obtaining unit operable to obtain the link information from the interchangeable lens; a second obtaining unit operable to obtain information about the position of the zoom lens on the optical axis; a generating unit operable to generate a control signal for controlling the focus driver based on the link information obtained by the first obtaining unit and the information about the position of the zoom lens obtained by the second obtaining unit; and a transmission unit operable to transmit the control signal generated by the generating unit to the interchangeable lens.

A camera system has the interchangeable lens and the camera body.

According to the above configurations, the interchangeable lens stores link information which links information about a position of the zoom lens on an optical axis with information about a variation in magnification, and the camera body controls driving of the focus lens based on the link information obtained from the interchangeable lens and a position of the zoom lens on the optical axis in recording of moving images. As a result, when a determination is made that the variation in magnification of the zoom lens becomes large, the state of the wobbling control can be suitably controlled. Therefore, suitable autofocus control can be performed according to the state of the zoom lens.

BRIEF DESCRIPTION OF THE DRAWINGS

FIG. 11 is a flowchart illustrating another algorithm for determining the amplitude in the wobbling control.

DETAILED DESCRIPTION OF THE PREFERRED EMBODIMENTS

Embodiments are described below with reference to the accompanying drawings.

1. First Embodiment

1-1. Outline

A camera system according to the first embodiment includes a camera body and an interchangeable lens which is mountable to the camera body. The camera system can record moving images. Further, when recording moving images, the camera system can perform autofocus control.

The interchangeable lens according to the first embodiment stores link information which links information about a position of a zoom lens on an optical axis with information about a variation in magnification. The camera body controls driving of a focus lens based on the link information obtained from the interchangeable lens and the position of the zoom lens on the optical axis at the time of recording moving images. As a result, the interchangeable lens, the camera body and the camera system according to the first embodiment enable suitable autofocus control according to a state of the zoom lens in the recording of the moving images.

1-2. Configuration

Figure 1:
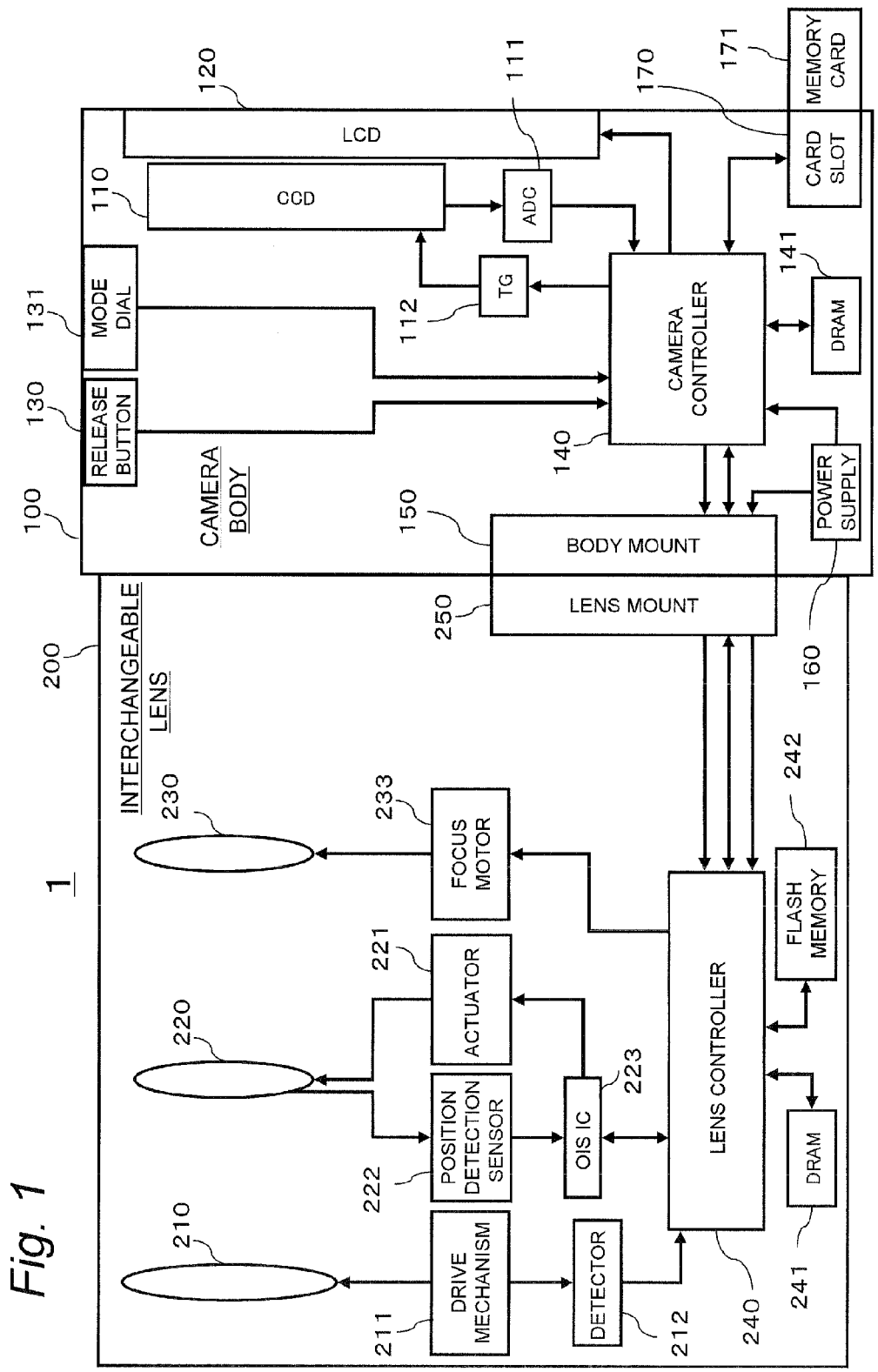
FIG. 1 is a block diagram illustrating a camera system according to first and second embodiments.

A configuration of the camera system according to the first embodiment is described with reference to FIG. 1. FIG. 1 illustrates the configuration of the camera system. The camera system 1 includes the camera body 100 and the interchangeable lens 200. Configurations of the camera body 100 and the interchangeable lens 200 are described below, respectively.

1-2-1. Configuration of Camera Body

The camera body 100 mainly includes a CCD image sensor 110, a liquid crystal display (LCD) monitor 120, a camera controller 140, a body mount 150, a power supply 160, and a card slot 170.

The camera controller 140 controls the entire camera system 1 (for example, the CCD image sensor 110) according to an instruction from an operating member such as a release button 130. The camera controller 140 transmits a vertical synchronizing signal to a timing generator 112. Simultaneously, the camera controller 140 generates an exposure synchronizing signal based on the vertical synchronizing signal. The camera controller 140 periodically transmits the generated exposure synchronizing signal to a lens controller 240 via the body mount 150 and a lens mount 250 in a repeated manner. The camera controller 140 uses a DRAM 141 as a work memory in a control operation and an image processing operation.

The CCD image sensor 110 captures a subject image incident via the interchangeable lens 200 so as to generate image data. An AD converter 111 digitizes the generated image data. The camera controller 140 gives various image processes to the digitized image data. The various image processes include, for example, a gamma correction process, a white balance correction process, a flaw correction process, an YC conversion process, an electronic zoom process, and an image compression process such as a JPEG compression process.

The CCD image sensor 110 operates at timing controlled by the timing generator 112. The CCD image sensor 110 performs, for example, a still image capturing operation, a moving image capturing operation, and a through image capturing operation. The through image means an image that is not recorded in a memory card 171 after the capturing. The through image is mainly a moving image, and is displayed on the LCD monitor 120 in order to determine a composition of recording a still image.

The LCD monitor 120 displays an image indicated by the display image data that is subjected to image process by the camera controller 140. The LCD monitor 120 can selectively display a moving image and a still image.

The memory card 171 can be mounted to the card slot 170. The card slot 170 controls the memory card 171 based on control of the camera controller 140. The memory card 171 can store the image data generated by the image process of the camera controller 140. The memory card 171 can store, for example, a JPEG image file. Further, the memory card 171 can output image data or an image file stored therein. The image data or the image file output from the memory card 171 are processed by the camera controller 140. For example, the camera controller 140 expands the image data or the image file obtained from the memory card 171 so as to generate display image data.

The power supply 160 supplies a power to be consumed in the camera system 1. The power supply 160 may be, for example, a dry battery or a rechargeable battery. Further, the power supply 160 may supply a power to the camera system 1 externally via a power-supply cord.

A mode dial 131 is a dial for changing a mode of the camera system 1. A user operates the mode dial 131 so as to be capable of switching the mode of the camera system 1 between a moving image recording mode and a still image recording mode.

The body mount 150 can be mechanically or electrically connected to the lens mount 250 of the interchangeable lens 200. The body mount 150 can transmit/receive data to/from the interchangeable lens 200 via the lens mount 250. The body mount 150 transmits an exposure synchronizing signal received from the camera controller 140 to the lens controller 240 via the lens mount 250. Further, the body mount 150 transmits the other control signals received from the camera controller 140 to the lens controller 240 via the lens mount 250. The body mount 150 transmits the signals received from the lens controller 240 to the camera controller 140 via the lens mount 250. The body mount 150 supplies a power received from the power supply 160 to the entire interchangeable lens 200 via the lens mount 250.

1-2-2. Configuration of Interchangeable Lens

The interchangeable lens 200 mainly has an optical system, the lens controller 240, and the lens mount 250. The optical system of the interchangeable lens 200 includes a zoom lens 210, an OIS lens 220, and a focus lens 230.

The zoom lens 210 is a lens for changing a magnification of a subject image formed by the optical system of the interchangeable lens 200. The zoom lens 210 is composed of one or a plurality of lenses. A drive mechanism 211 includes a zoom ring or the like operable by the user, and transmits a user's operation to the zoom lens 210 so as to move the zoom lens 210 along a direction of the optical axis of the optical system. A detector 212 detects a drive amount of the drive mechanism 211. The lens controller 240 obtains a result detected by the detector 212 so as to be capable of recognizing a zoom magnification of the optical system. Further, the lens controller 240 obtains the result detected by the detector 212 so as to be capable of recognizing the position of the zoom lens 210 on the optical system.

The OIS lens 220 is a lens for correcting blur of a subject image formed in the optical system of the interchangeable lens 200. The OIS lens 220 moves to a direction where blur of the camera system 1 is compensated so as to reduce the blur of the subject image on the CCD image sensor 110. The OIS lens 220 is composed of one or a plurality of lenses. An actuator 221 drives the OIS lens 220 in a plane vertical to the optical axis of the optical system under control of an OIS IC 223. The actuator 221 can be realized by, for example, a magnet and a planar coil. A position detection sensor 222 is a sensor for detecting a position of the OIS lens 220 in the plane vertical to the optical axis of the optical system. The position detection sensor 222 can be realized by, for example, a magnet and a Hall element. The OIS IC 223 controls the actuator 221 based on a detected result of the position detection sensor 222 and a detected result of a blur detector such as a gyro sensor.

The focus lens 230 is a lens for changing a focus state of a subject image formed on the CCD image sensor 110 by the optical system. The focus lens 230 is composed of one or a plurality of lenses.

A focus motor 233 drives the focus lens 230 so that the focus lens 230 advances and retreats along the optical axis of the optical system based on control of the lens controller 240. As a result, the focus state of a subject image formed on the CCD image sensor 110 can be changed in the optical system. Further, the focus motor 233 drives the focus lens 230 so that the focus lens 230 slightly advances and retreats along the optical axis of the optical system based on control of the lens controller 240. As a result, even when moving images are recorded, the autofocus control can be performed. A stepping motor can be used as the focus motor 233 in the first embodiment. The focus motor 233 is not, however, limited to this, and can be realized by a servo motor, an ultrasonic motor or the like.

The lens controller 240 controls the entire interchangeable lens 200 (for example, the OIS IC 223 and the focus motor 233) based on a control signal from the camera controller 140. The lens controller 240 receives signals from the detector 212 and the OIS IC 233 and the like so as to transmit them to the camera controller 140. The lens controller 240 transmits/receives the signals to/from the camera controller 140 via the lens mount 250 and the body mount 150. The lens controller 240 uses a DRAM 241 as a work memory at the time of control. For example, the lens controller 240 receives an instruction of a wobbling operation from the camera controller 140 so as to control the wobbling operation of the focus lens 240. The wobbling control is a control to continuously perform the autofocus control by slightly advancing and retreating the focus lens 230 along the optical axis while the camera system 1 is recording a moving image.

A flash memory 242 saves programs and parameters to be used for the control of the lens controller 240. The flash memory 242 saves, for example, a control program for controlling the wobbling of the focus lens 230 and a program for performing the autofocus control in recording of a still image (so-called hill climbing autofocus control). The hill climbing autofocus control is a focusing method for moving the focus lens 230 along the optical axis and detecting a position where a contrast value of an image captured by the CCD image sensor 110 becomes the largest in each position so as to move the focus lens 230 to the detected position. The wobbling control and the hill climbing autofocus control are described in detail below.

In the first embodiment, the flash memory 242 further saves link information. The link information is information indicating a change rate of the magnification of a subject changing according to the focus lens 230 which slightly advances and retreats along the optical axis when the zoom lens 210 is located at a certain position of the optical axis. Details of the link information are described later.

1-2-3. Wobbling Control and Hill Climbing Autofocus Control

Figure 2:
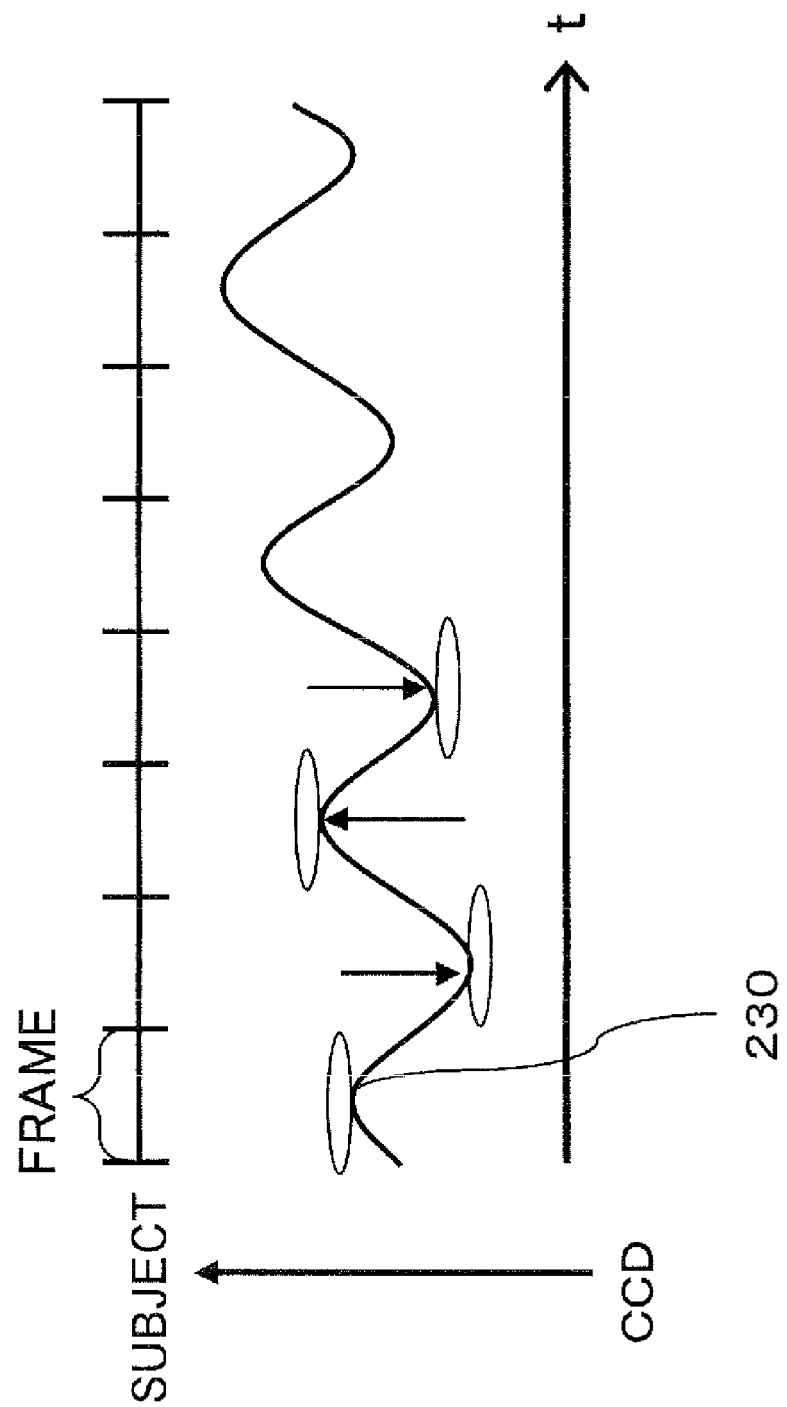
FIG. 2 is a typical diagram describing wobbling control.

The wobbling control is first described with reference to FIG. 2. FIG. 2 is a typical diagram describing the wobbling control. In FIG. 2, a vertical axis indicates the position of the focus lens 230 on the optical axis. A horizontal axis indicates a time axis. In FIG. 2, the focus lens 230 repeats the slight advancing and retreating along the optical axis and simultaneously moves gradually to a subject side. In the wobbling control, the camera system 1 advances and retreats the focus lens 230 along the optical axis every capturing of an image for one frame. The advancing and retreating of the focus lens 230 are not performed at a constant speed. The camera system 1 reduces the moving speed of the focus lens 230 in a vicinity where the advancing direction of the focus lens 230 is changed (that is, near the focus position). As a result, a moving image in which focus condition is approximately constant can be recorded through the entire recording time.

Every time when the camera system 1 captures an image for 1 frame and generates image data, it calculates an evaluation value for the autofocus operation on the generated image data (hereinafter, "AF evaluation value"). For example, the following method is known. In this method, brightness signals are obtained from the image data generated by the CCD image sensor 110, and high-frequency components of the brightness signals on a screen are integrated so that an AF evaluation value is obtained. In such a manner, the camera system 1 calculates AF evaluation values in a state that the focus lens 230 is moved along the direction of the optical axis to the subject side and in a state that the focus lens 230 is moved to the side of the CCD image sensor 110 according to the generation of image data for two frames. By comparing the two AF evaluation values, the camera system 1 determines whether the focus lens 230 should be moved to the subject side or to the side of the CCD image sensor 110 at a later cycle. The camera system 1 advances and retreats the focus lens 230 along the optical axis so that a subject image is continuously focused at the time of recording a moving image. The lens controller 240 controls the focus motor 233 according to the acquisition of control signals indicating instructions of a moving direction, a moving amount and an amplitude of the focus lens 230 from the camera body 100 via the lens mount 250.

Figure 3:
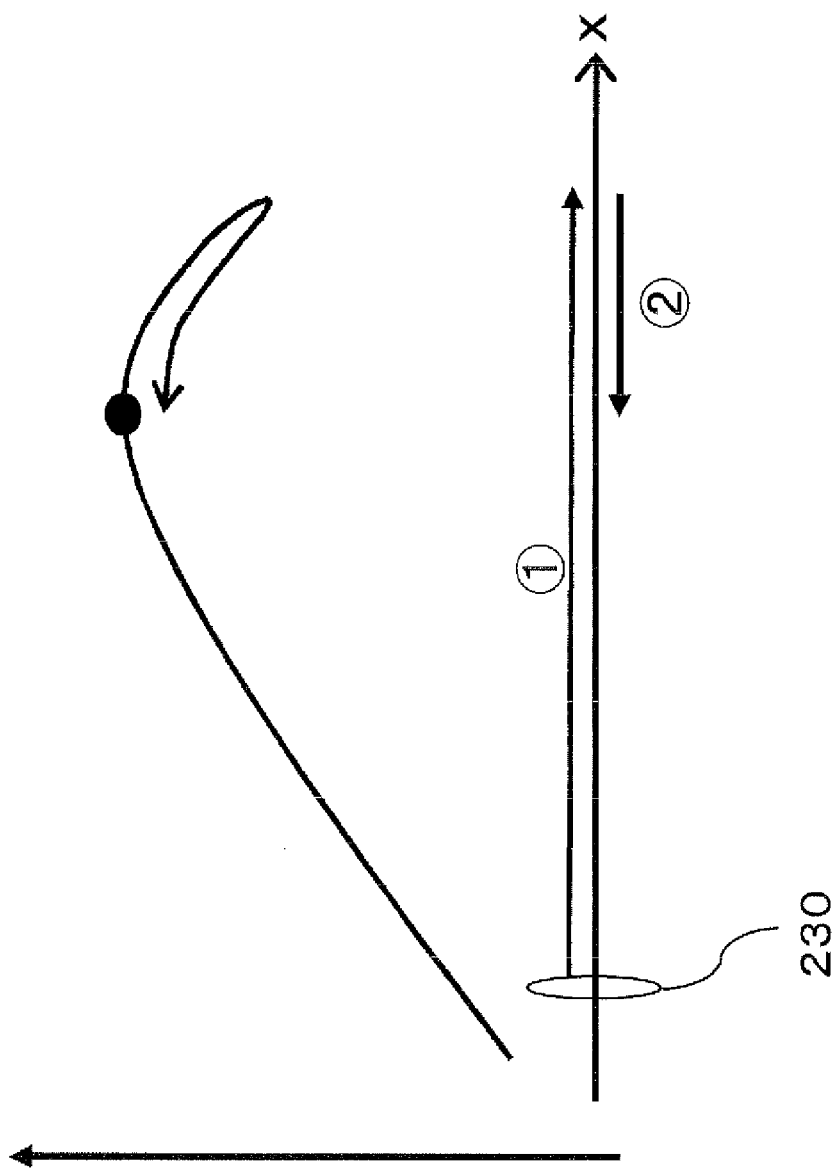
FIG. 3 is a typical diagram describing hill climbing AF control.

The hill climbing autofocus control is described below with reference to FIG. 3. FIG. 3 is a typical diagram for describing the hill climbing autofocus control. In FIG. 3, a vertical axis indicates the AF evaluation value, and a horizontal axis indicates the position of the focus lens 230 on the optical axis. The wobbling control is suitable for the autofocus control in the recording of moving images, and on the contrary, the hill climbing autofocus control is suitable mainly for the autofocus control in the recording of still images.

When the hill climbing autofocus control is performed, the camera system 1 continuously drives the focus lens 230 in one direction such as either a direction toward an infinity end or a direction toward a nearest end of the interchangeable lens 200. The camera system 1 continuously calculates the AF evaluation value periodically according to the drive of the focus lens 230. The camera system 1 continuously drives the focus lens 230 in one direction as long as the AF evaluation value increases. When the AF evaluation value stops increasing and starts decreasing, the camera system 1 determines that the focus lens 230 passes through the focus point, and drives the focus lens 230 in a reverse direction. As a result, the camera system 1 moves the focus lens 230 to the focus point. The camera system 1 can obtain the focus state by driving the focus lens 230 in such a manner.

1-2-4. Link Information

Figure 4:
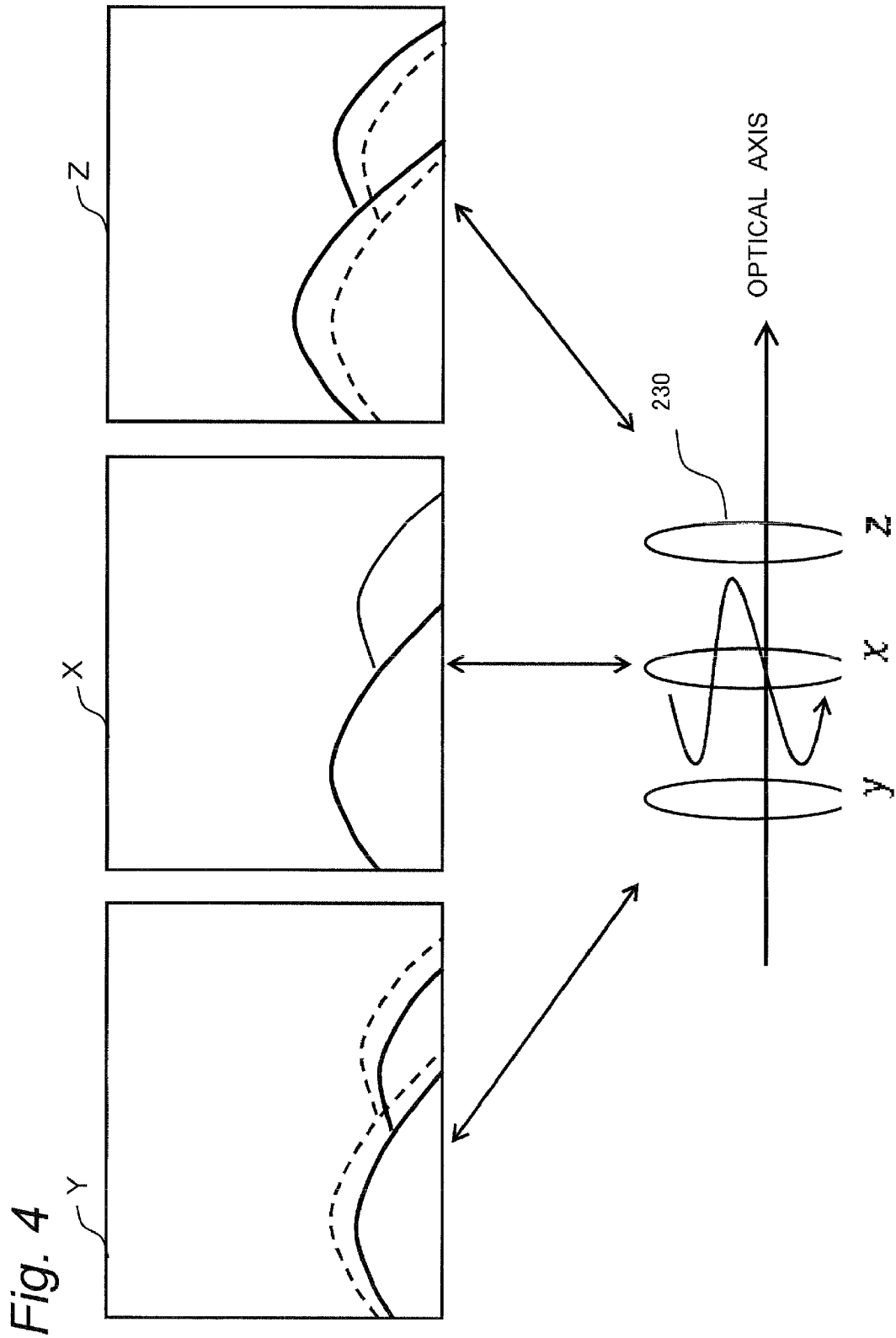
FIG. 4 is a diagram illustrating a variation in magnification.
Figure 5:
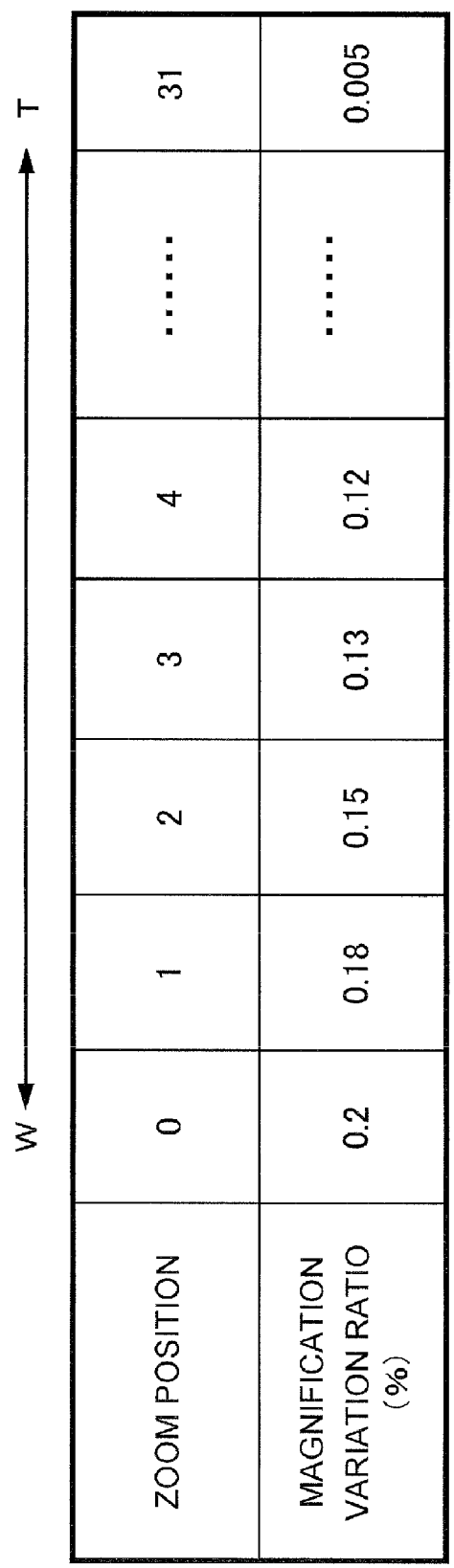
FIG. 5 is a diagram illustrating link information.
Figure 6:
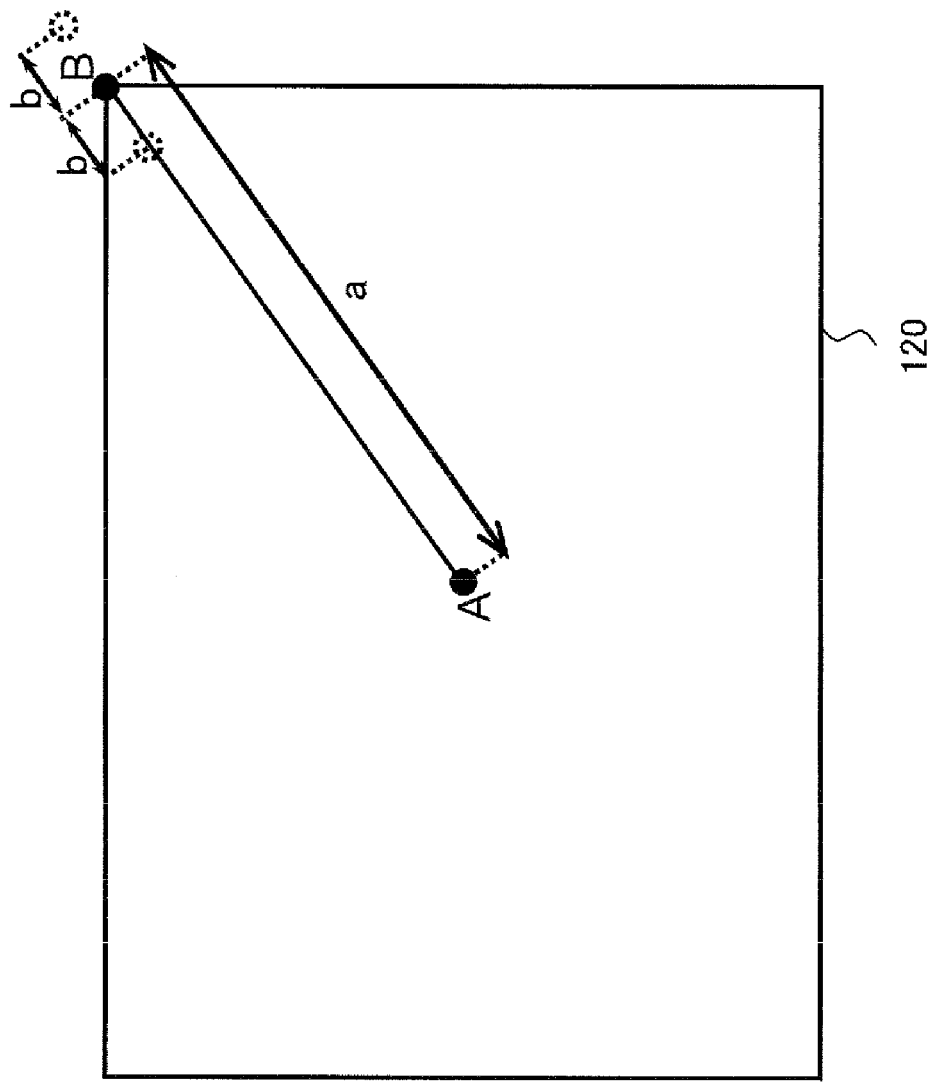
FIG. 6 is a typical diagram describing magnification variation ratio.

The link information is described below with reference to FIGS. 4, 5 and 6. FIG. 4 is a typical diagram describing a variation in the magnification. FIG. 5 is a diagram illustrating the link information. FIG. 6 is a typical diagram describing magnification variation ratio. The interchangeable lens 200 stores a table about the link information shown in FIG. 5 in the flash memory 242.

After a focus state is obtained with combining the zoom lens 210 and the focus lens 230, when the focus lens 230 is moved, the magnification changes. For example, after the focus state is obtained, with the zoom lens 210 is positioned at a certain position on the optical axis of the interchangeable lens 200, when the wobbling control of the focus lens 230 is performed for autofocus in the recording of moving images or the focus lens 230 is moved for autofocus in the recording of still images, the magnification changes. That is to say, in the case where the wobbling control of the focus lens 230 is performed for autofocus in the recording moving of images or the focus lens 230 is moved for autofocus in the recording of still images, a focal length of the interchangeable lens 200 changes, and thus the magnification changes. This is because a size of the subject image captured on the CCD image sensor 110 changes when the focal length of the interchangeable lens 200 changes.

As shown in FIG. 4, for example, when the focus lens 230 is located at a position "x" on the optical axis, an image X is captured on the CCD image sensor 110. In this state, when the wobbling control of the focus lens 230 is performed and the focus lens 230 is moved to a position "y", an image Y is captured on the CCD image sensor 110. The magnification of a subject in the image Y is lower than that in the image X (a broken line in the image Y corresponds to the subject in the image X). Further, when the wobbling control of the focus lens 230 is performed and the focus lens 230 is moved to a position "z", an image Z is captured on the CCD image sensor 110. The magnification of the subject in the image Z is higher than that in the image X (a broken line in the image Z corresponds to the subject in the image X). When the wobbling control of the focus lens 230 is performed in such a manner, the magnification of the subject image captured on the CCD image sensor 110 changes.

The more an amplitude (swing width) in wobbling of the focus lens 230 is increased, the more noticeable the variation in the magnification of the subject image captured on the CCD image sensor 110 becomes. The variation in the magnification changes according to the position of the zoom lens 210 (close to a wide-angle side or a telephoto side). Although the variation in the magnification changes according to characteristics of the optical system, the variation in the magnification is higher on the wide-angle side and is lower on the telephoto side in the interchangeable lens 200 according to the first embodiment.

The link information is described below with reference to FIG. 5. The link information is management information which links the information about the position of the zoom lens 210 on the optical axis with the information indicating a change rate of the magnification (hereinafter, referred to as "magnification variation ratio") caused by the wobbling control of the focus lens 230 in the case that the zoom lens 210 is located at the position. In the example of FIG. 5, the amplitude of the wobbling control is constant (for example, 80 μm), and the magnification variation ratio on the respective positions of the zoom lens is obtained. In the interchangeable lens 200, the position of the zoom lens 210 on the optical axis is divided into 32 stages, and the zoom lens 210 can be held on the respective positions. In FIG. 5, "the zoom position" indicates a position of the zoom lens 210 on the optical axis of the interchangeable lens 200. When the zoom lens 210 is located at each of 32 positions and the wobbling control of the focus lens 230 is performed, an image that transmits through the interchangeable lens 200 to be captured on the CCD image sensor 110 has the variation in magnification which changes variously according to the positions of the zoom lens 210. In FIG. 5, "magnification variation ratio (%)" indicates the change rate of the magnification on the respective positions of the zoom lens 210.

The magnification variation ratio is obtained by a ratio of an amount of movement when one predetermined point in a region of an image transmitting through the interchangeable lens 200 to be captured on the CCD image sensor 110 in the wobbling control of the focus lens 230 moves, to a length from a center point to the one predetermined point in the CCD image sensor 110. This is concretely described with reference to FIG. 6. FIG. 6 illustrates an image that is captured by the CCD image sensor 110 and is displayed on the LCD monitor 120. It is assumed that one point in which the amount of movement is observed is "B", and a center point of the LCD monitor 120 is "A", when the wobbling control of the focus lens 230 is performed. Further, it is assumed that a distance from the point A to the point B is "a", and a distance of movement by the point B in the wobbling control of the focus lens 230 is "b". In this case, the magnification variation ratio is b/a. For example, in the table shown in FIG. 5, when the position of the zoom lens 210 is "0", b/a=0.2(%).

In the camera system 1 according to the first embodiment, one point in which the amount of movement is observed is the most corner portion on the captured image (that is, the LCD monitor 120), but it is not necessarily to the most corner portion. For example, it may be a right portion or a left portion. In short, this one point may be any one point separated from the center.

In the camera system 1 according to the first embodiment, the movement of one point is observed so that the magnification variation ratio is determined in the case where the zoom lens 210 is located at the predetermined position. However, the magnification variation ratio is not necessarily determined by such a method. For example, movements of a plurality of points are observed, and the largest amount of movement of any one of the points may be adopted as the magnification variation ratio in the case where the zoom lens 210 is located at that position.

The interchangeable lens 200 according to the first embodiment manages the magnification variation ratios for the respective positions of the zoom lens 210 as the link information, but does not have to have such a configuration. The interchangeable lens 200 may manage an amount of movement of a predetermined point displayed on the LCD monitor 120 for the respective positions of the zoom lens 210 in the case of the wobbling control of the focus lens 230. In short, the interchangeable lens 200 may manage information indicating differences in the variation of the magnification on the respective positions of the zoom lens 210.

The interchangeable lens 200 according to the first embodiment divides a movable position into 32 points so as to manage the positions of the zoom lens 210, but does not necessarily manage in such a manner. For example, the movable position may be divided into 10 points, or may be divided into 64 points, or may be divided into 100 points so as to be managed. In short, any method may be adopted as long as the position of the zoom lens 210 can be managed.

The interchangeable lens 200 according to the first embodiment is a zoom lens. However, the interchangeable lens 200 is not necessarily limited to the zoom lens. For example, the interchangeable lens 200 may be a single focus lens. In this case, the single focus lens may have only information about magnification variation ratios regardless of a position of zoom lens as link information.

The interchangeable lens 200 according to the first embodiment saves the link information in the flash memory 242. As a result, the magnification variation ratios on the respective positions of the zoom lens 210 can be transmitted to the camera body 100 in advance (before recording). As a result, even when any interchangeable lens having any magnification change characteristics is mounted to the camera body 100, the camera body 100 can transmit an instruction to the interchangeable lens 200 so that wobbling control suitable for the respective positions of the zoom lens 210 is performed.

1-3. Operation

1-3-1. Recording Preparation Operation

Figure 7:
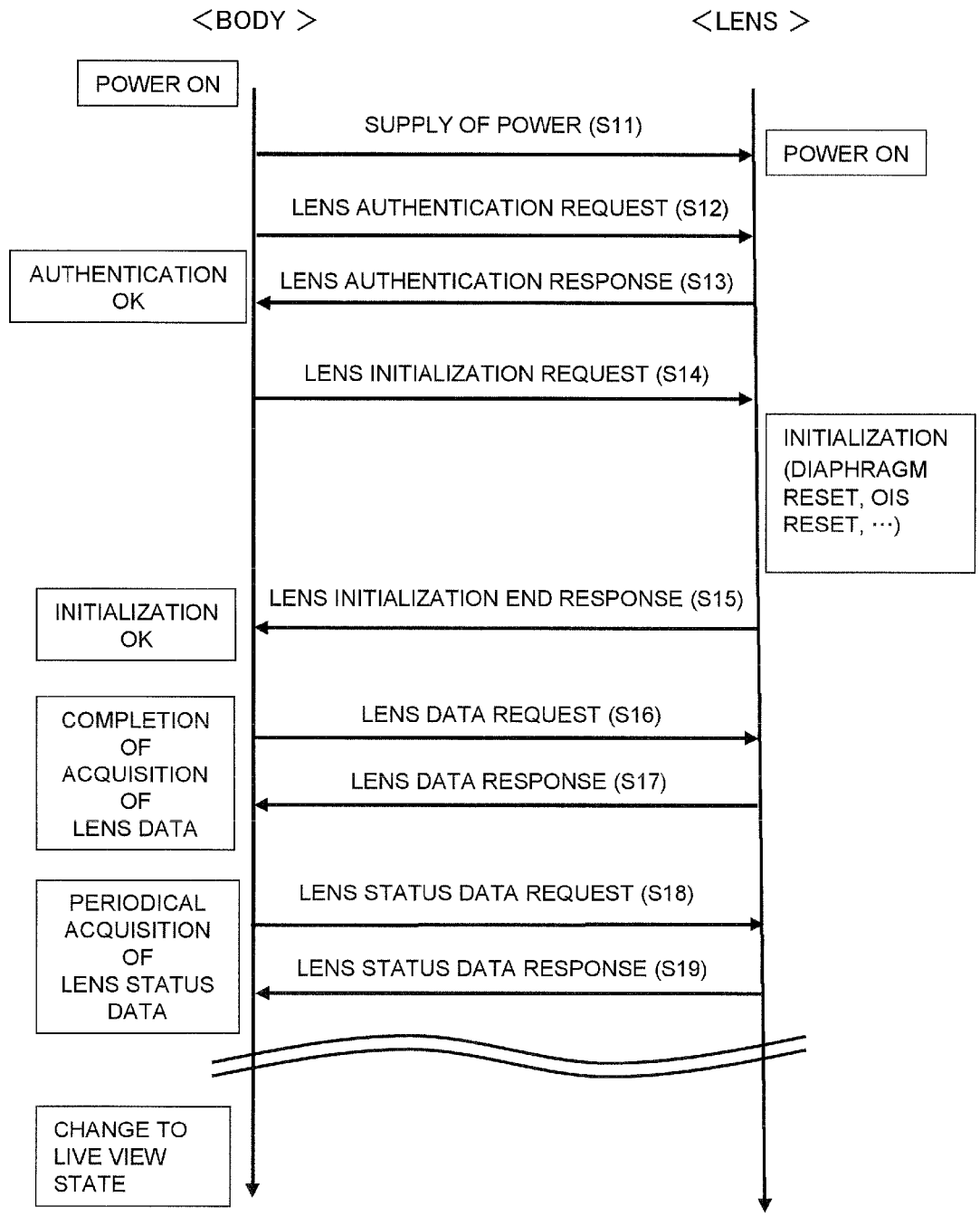
FIG. 7 is a diagram illustrating transmission/reception of signals in a recording preparation operation of a camera system.

The operation of the camera system 1 for recording preparation is described. FIG. 7 illustrates timings of transmitting and receiving a signal in the recording preparation operation of the camera system 1 according to the first embodiment.

When the interchangeable lens 200 is mounted to the camera body 100 and the user turns on the power of the camera body 100, the power supply 160 supplies a power to the interchangeable lens 200 via the body mount 150 and the lens mount 250 (S11). The camera controller 140 requests the lens controller 240 to transmit authentication information about the interchangeable lens 200 (S12). The authentication information about the interchangeable lens 200 includes information about whether or not the interchangeable lens 200 is mounted and information about whether or not an accessory is attached. The lens controller 240 responds to the lens authentication request from the camera controller 140 (S13).

The camera controller 140 then requests the lens controller 240 to perform an initializing operation (S14). In response to this, the lens controller 240 performs the initializing operation such as resetting of a diaphragm and resetting of the OIS lens 220. Thereafter, the lens controller 240 transmits information about the completion of the lens initializing operation back to the camera controller 140 (S15).

The camera controller 140 requests the lens controller 240 to transmit lens data (S16). The lens data is stored in the flash memory 242. The lens data includes characteristic values specific to the interchangeable lens 200 such as a lens name, an F-number, a focal length and link information. The lens controller 240 reads the lens data from the flash memory 242 and transmits it back to the camera controller 140 (S17). The camera body 100 obtains the link information at the recording preparation stage in such a manner, so that the camera body 100 can recognize the magnification variation ratios on the positions of the zoom lens 210 at the recording preparation stage.

When the camera controller 140 obtains the lens data of the interchangeable lens 200 mounted to the camera body 100, it is in the recording enabled state. The camera controller 140 in this state periodically requests the lens controller 240 to transmit lens status data indicating the status of the interchangeable lens 200 (S18). The lens status data includes, for example, zoom magnification information of the zoom lens 210, position information about the focus lens 230 and aperture value information. In response to this request, the lens controller 240 transmits the requested lens status data back to the camera controller 140 (S19).

The camera system 1 according to the first embodiment transmits the link information to the camera body 100 from the interchangeable lens 200 at the recording preparation stage. As a result, even when any interchangeable lens having any magnification change characteristics is mounted to the camera body 100, the camera body 100 can transmit the instruction for performing the suitable wobbling control on the respective positions of the zoom lens 210 to the interchangeable lens 200.

1-3-2. Wobbling Operation in Recording of Moving Images

Figure 8:
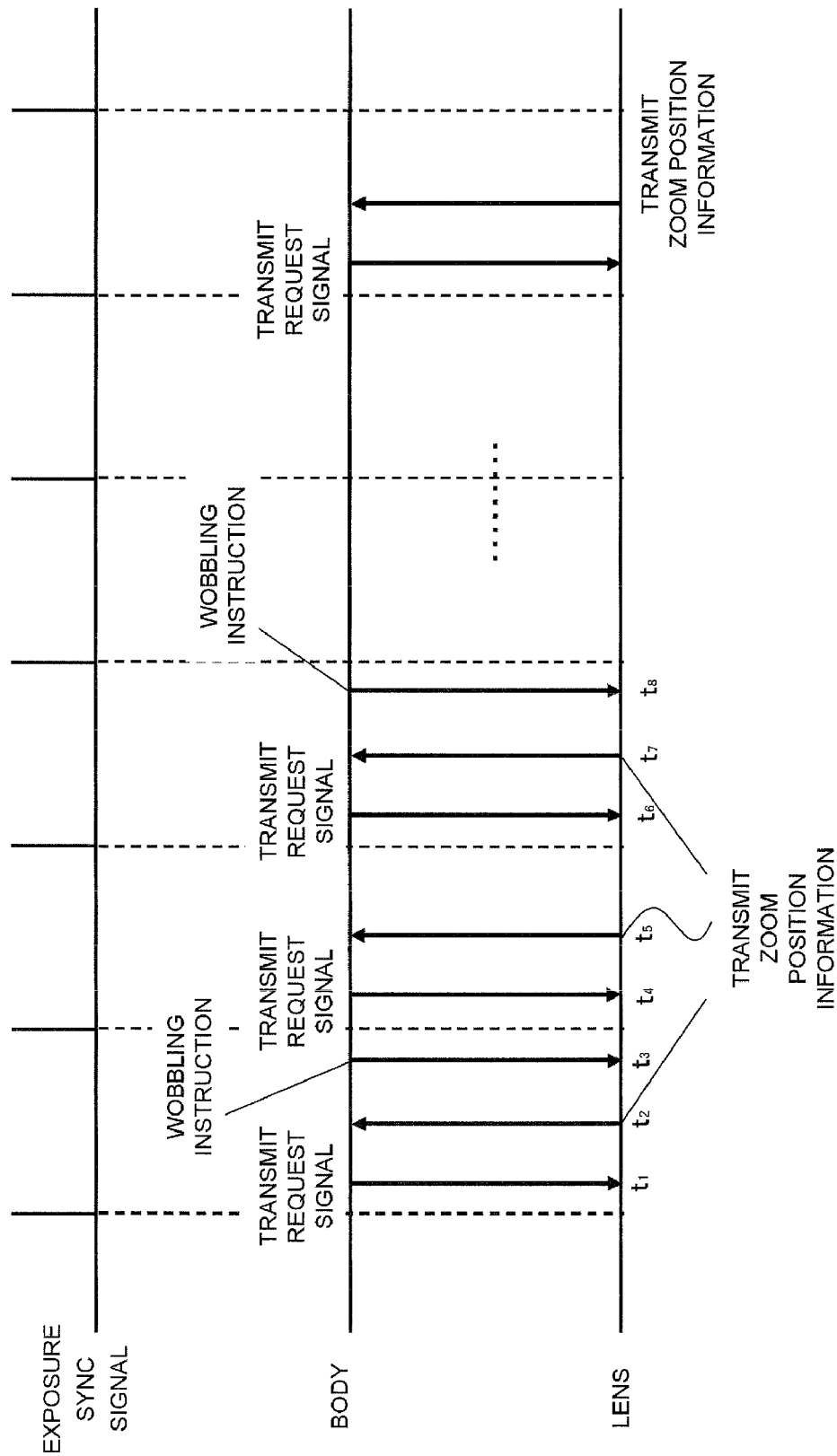
FIG. 8 is a timing chart illustrating transmission/reception of signals between the camera body and the interchangeable lens in the wobbling control.
Figure 9:
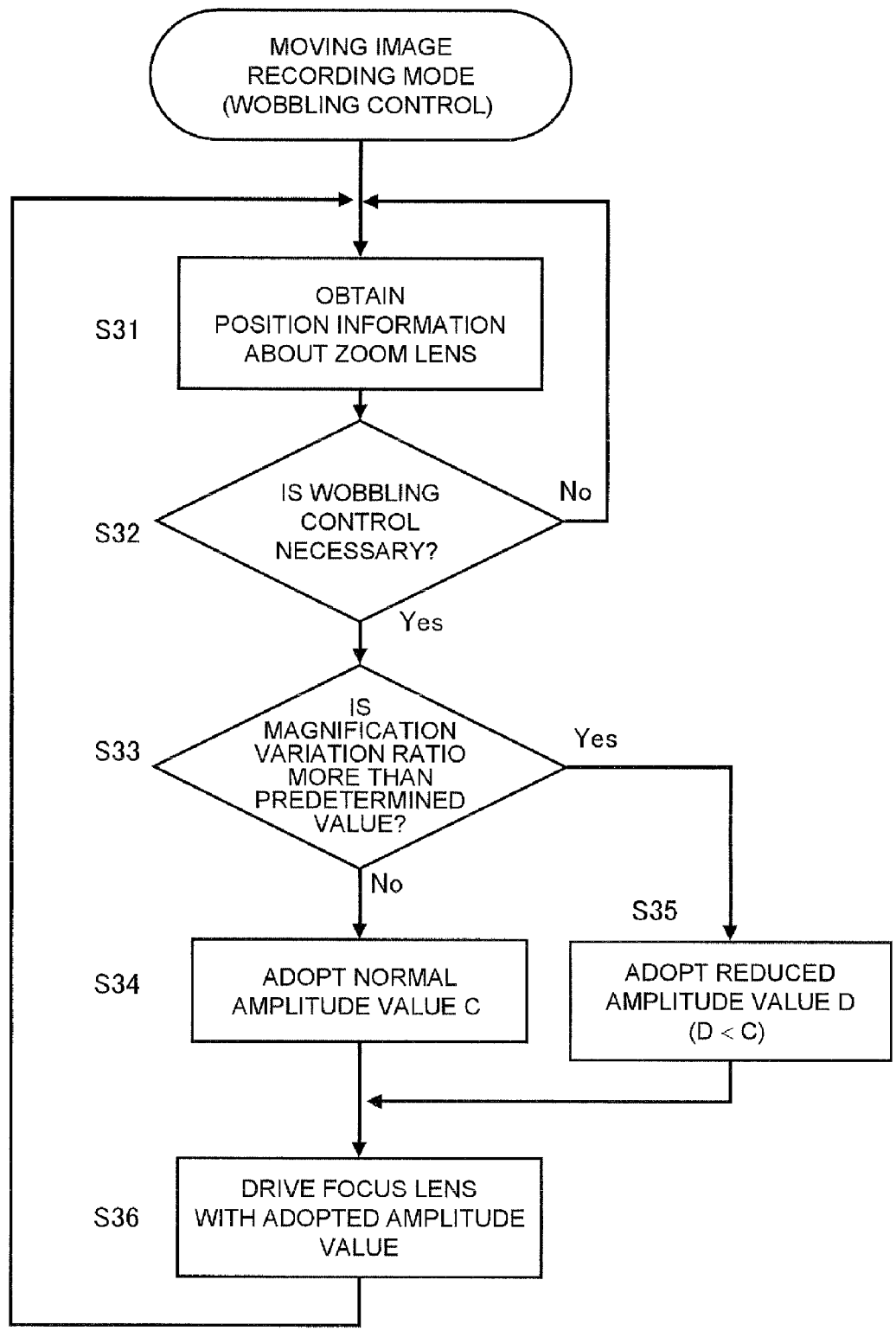
FIG. 9 is a flowchart illustrating an algorithm for determining an amplitude in the wobbling control.

The wobbling operation in the recording of moving images is described with reference to FIGS. 8 and 9. FIG. 8 is a diagram illustrating transmission/reception timing of signals between camera body 100 and the interchangeable lens 200 in the wobbling control. FIG. 9 is a flowchart illustrating an algorithm for determining amplitude in the wobbling control.

The transmission/reception of commands between the camera body 100 and the interchangeable lens 200 in the wobbling control in the camera system 1 according to the first embodiment is described with reference to FIG. 8. The user can set the camera system 1 into a moving image recording mode by operating the mode dial 131. When the moving image recording mode is set, the camera controller 140 stands by until it receives an instruction for starting the moving image recording from the user. At this time, the camera body 100 and the interchangeable lens 200 already synchronize with each other. As one example of the transmission/reception of data during the synchronization, the camera controller 140 transmits a request signal for requesting information about the position of the zoom lens 210 on the optical axis to the interchangeable lens 200 (t1). When receiving the request signal, the lens controller 240 obtains the information about the position of the zoom lens 210 on the optical axis from the detector 212 so as to transmit it to the camera body 100 (t2).

At this time point, for example, when the camera controller 140 receives the instruction for starting the moving image recording from the user and determines that the wobbling control of the focus lens 230 should be performed, it transmits a wobbling instruction command for instructing the wobbling to the interchangeable lens 200 via the body mount 150 (t3). The wobbling instruction command is a command for instructing amount of movement, a moving direction and amplitude at the time of the wobbling of the focus lens 230 (details of a method for determining the wobbling amplitude are described later). When obtaining the wobbling instruction command, the lens controller 240 controls the focus motor 233 so that the focus lens 230 is driven according to the command contents.

After transmitting the wobbling instruction command to the interchangeable lens 200, at next exposure timing, the camera controller 140 transmits the request signal to the interchangeable lens 200 (t4). When receiving the request signal, the lens controller 240 obtains the information about the position of the zoom lens 210 on the optical axis from the detector 212 and transmits it to the camera body 100 (t5).

When the camera controller 140 receives the information about the position of the zoom lens 210 on the optical axis and determines that the position of the zoom lens 210 is not particularly changed and a new wobbling instruction command does not have to be transmitted, it transmits a request signal to the interchangeable lens 200 at next exposure timing (t6). When receiving the request signal, the lens controller 240 obtains the information about the position of the zoom lens 210 on the optical axis from the detector 212 and transmits it to the camera body 100 (t7).

When the camera controller 140 receives the information about the position of the zoom lens 210 on the optical axis and determines that a new wobbling instruction command should be transmitted due to a situation such that the position of the zoom lens 210 is changed, it transmits the wobbling instruction command to the interchangeable lens 200 at next exposure timing (t8).

The camera controller 140 receives also information about the position of the focus lens 230 on the optical axis at a cycle correlated with the exposure timing (not shown). Further, the camera controller 140 calculates an AF evaluation value at each exposure timing. The camera controller 140 makes a determination while linking the information about the positions of the focus lens 230 with the AF evaluation values on the respective positions. As a result, the camera controller 140 can determine the focus position of the focus lens 230.

By repeating such a control, the camera system 1 performs the autofocus control by means of the wobbling.

The algorithm for determining the wobbling amplitude when the camera body 100 according to the first embodiment generates the wobbling instruction command for performing the wobbling control of the focus lens 230, is described below with reference to FIG. 9. The user can set the camera system 1 into the moving image recording mode by operating the mode dial 131.

When the moving image recording mode is set, the camera controller 140 obtains information about a position of the zoom lens 210 at the cycle correlated with the exposure timing of the CCD image sensor 110 (S31). The camera controller 140 determines whether or not the wobbling control is necessary (S32). When the wobbling control is necessary, the camera controller 140 obtains magnification variation ratio linked with the obtained position information based on the current position information about the zoom lens 210 obtained at step S31 and the link information obtained at the recording preparation stage (step S17 in FIG. 7). The camera controller 140 then determines whether or not the magnification variation ratio is more than a predetermined value (S33).

When the magnification variation ratio is determined as being not more than the predetermined value (No at S33), the camera controller 140 determines the wobbling amplitude of the focus lens 230 to a normal amplitude value C (S34). In this case, for example, the camera controller 140 determines the wobbling amplitude to be 80 (μm) as the normal amplitude value C. On the other hand, when the magnification variation ratio is determined as being more than the predetermined value (Yes at S33), the camera controller 140 determines the wobbling amplitude of the focus lens 230 to a value D lower than the predetermined value (S35). For example, the camera controller 140 determines the wobbling amplitude to be 60 (μm) as the amplitude value D. The camera controller 140 transmits the wobbling control command including the determined amplitude value to the interchangeable lens 200 so as to drive the focus lens 230 (S36).

The camera system 1 according to the first embodiment generates the wobbling control command based on the link information in the interchangeable lens 200 and the information about the position of the zoom lens 210 on the optical axis. This is because the suitable wobbling control method varies according to the link information and the magnification variation ratio determined based on the position of the zoom lens 210 on the optical axis. Therefore, the camera system 1 generates the wobbling control command based on the link information in the interchangeable lens 200 and the information about the position of the zoom lens 210 on the optical axis so as to generate the suitable wobbling control command moment to moment.

The camera system 1 according to the first embodiment determines the wobbling amplitude according to the information about the variation in the magnification managed in relation with the position of the zoom lens 210 on the optical axis. This is because the suitable wobbling amplitude also changes according to a difference of the variation in the magnification. Therefore, the wobbling amplitude is controlled according to the information about the variation in the magnification managed in relation with the position of the zoom lens 210 on the optical axis, so that the camera system 1 can realize more suitable wobbling control.

When the zoom lens 210 is located at a position where the magnification variation ratio becomes higher than the predetermined value, the camera system 1 according to the first embodiment reduces the amplitude in the wobbling control of the focus lens 230 to an amplitude lower than the normal amplitude. This is because, when the magnification variation ratio is high, if the wobbling control is performed with the wobbling amplitude maintained at a normal amplitude, the variation in the magnification becomes noticeable and thus a recorded image becomes unsightly. When the magnification variation ratio becomes high, the wobbling amplitude is reduced to be lower than the normal value, so that the camera system 1 can realize the recording of an easily viewable image in which variation in the magnification is unnoticeable.

The camera system 1 according to the first embodiment determines the amplitude in the wobbling of the focus lens 230 according to whether or not the magnification variation ratio on the current position of the zoom lens 210 is higher than the predetermined value. However, the camera system 1 doses not have to always have such a configuration. For example, the configuration may be such that factors to be multiplied by the amplitude in the wobbling control of the focus lens 230 are related to the respective positions of the zoom lens 210 on the optical axis. As a result, since the amplitude in the wobbling control can be determined for the respective positions of the zoom lens 210, the configuration can accurately cope with an influence of the variation in the magnification according to the positions of the zoom lens 210 on the optical axis.

1-3-3. Hill Climbing Autofocus Operation

The camera system 1 can perform the hill climbing autofocus operation in the recording of moving images and still images according to user's instructions. Even when the hill climbing autofocus operation is performed, the camera system 1 obtains the position information about the zoom lens 210 every exposure timing, similarly to the case of the wobbling control of the focus lens 230. Further, when the drive speed of the focus lens 230 in the hill climbing autofocus operation is determined, the camera system 1 uses the magnification variation ratio information about the respective positions of the zoom lens 210.

Figure 10:
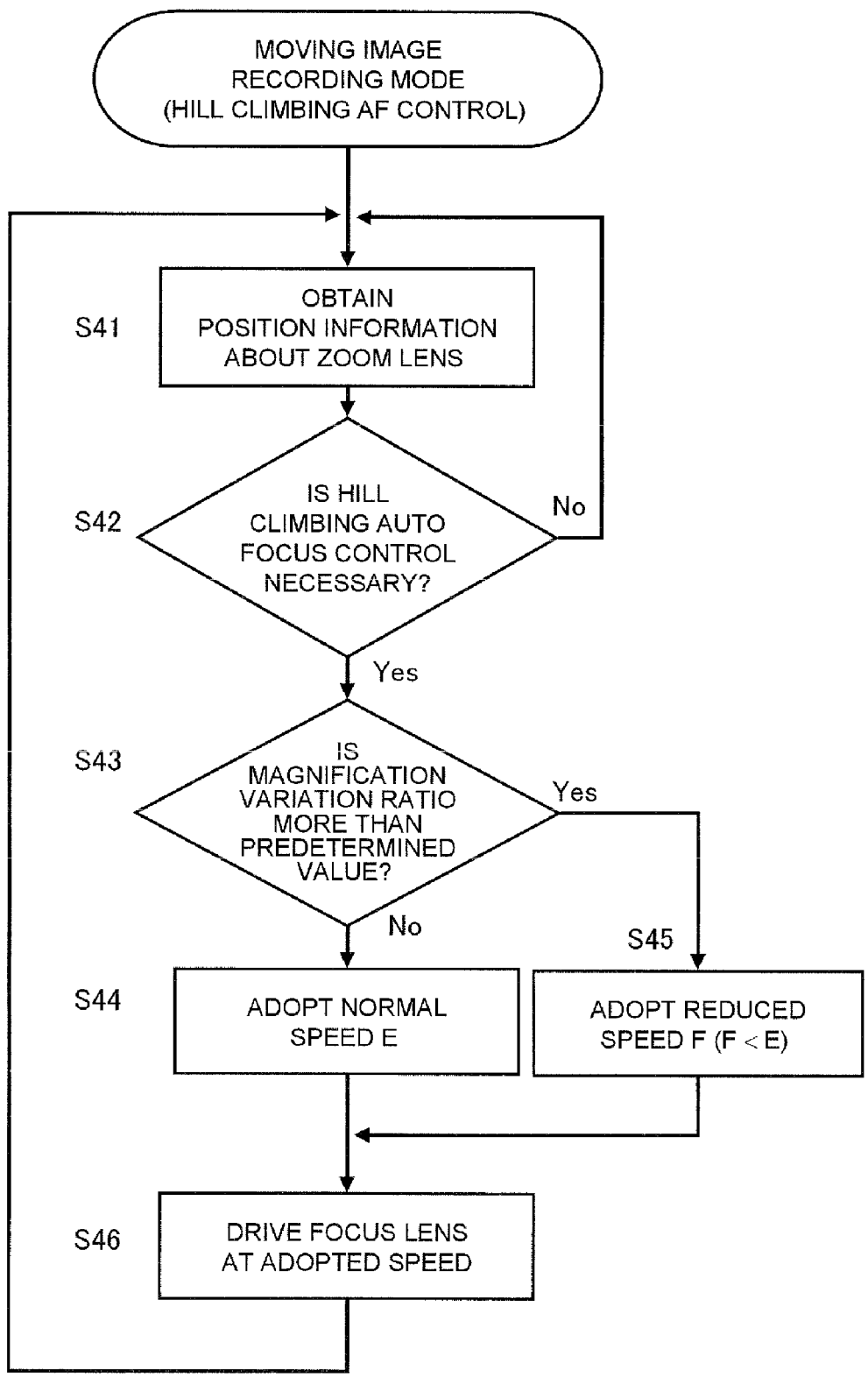
FIG. 10 is a flowchart illustrating an algorithm for determining a drive speed in the hill climbing AF.

The algorithm for determining the drive speed of the focus lens 230 in the hill climbing autofocus operation of the camera system 1 is described with reference to FIG. 10. FIG. 10 is a flowchart describing the algorithm for determining the drive speed of the focus lens 230 in the hill climbing autofocus operation of the camera system 1.

The user can set the camera system 1 into the moving image recording mode by operating the mode dial 131. When the moving image recording mode is set, the camera controller 140 obtains the position information about the zoom lens 210 at the cycle correlated with the exposure timing of the CCD image sensor 110 (S41). The camera controller 140 determines whether or not the hill climbing autofocus control is necessary (S42). When the hill climbing autofocus control is necessary, the camera controller 140 obtains the magnification variation ratio linked with the obtained position information based on the current position information about the zoom lens 210 obtained at step S41 and the link information obtained at the recording preparation stage (step S17 in FIG. 7). The camera controller 140 then determines whether or not the magnification variation ratio is more than a predetermined value (S43).

When the magnification variation ratio is determined as being not more than the predetermined value (No at S43), the camera controller 140 determines the drive speed of the focus lens 230 to a normal speed E (S44). On the other hand, when the magnification variation ratio is determined as being more than the predetermined value (Yes at S43), the camera controller 140 determines the drive speed of the focus lens 230 to a value F lower than the normal speed (S42).

When the magnification variation ratio on the position of the zoom lens 210 is more than the predetermined value in the hill climbing autofocus control, the camera system 1 according to the first embodiment sets the drive speed of the focus lens 230 to a lower value than the normal value. As a result, even when the focus lens 230 passes through the focus point, the camera system 1 can reduce the passing amount in the hill climbing autofocus control. As a result, even when the zoom lens 210 is located at the position where the magnification variation ratio becomes large, the camera system 1 can make it comparatively hard for the user to feel the variation in the magnification.

In the camera system according to the first embodiment, the interchangeable lens 200 stores the link information which links the information about the position of the zoom lens 210 on the optical axis with the information about the variation in the magnification, and the camera body 100 determines the amplitude of the focus lens 230 in the wobbling control and the drive speed of the focus lens 230 in the hill climbing autofocus control based on the link information obtained from the interchangeable lens 200 and the position of the zoom lens 210 on the optical axis. As a result, when moving images are recorded, the suitable autofocus control can be performed according to the state of the zoom lens 210. Therefore, an image in which variation in the magnification is unnoticeable can be recorded.

2. Second Embodiment

In the second embodiment, another method for determining the amplitude value in the wobbling control is described. In the example of the first embodiment shown in FIG. 9, the normal amplitude value C and the reduced amplitude value D are provided, and the amplitude value to be adopted is determined based on the magnification variation ratio corresponding to the position of the zoom lens 210. In another example, every time when the focus lens 230 is tried to be driven, the amplitude value may be calculated according to the position of the zoom lens 210 at that time. The algorithm is concretely described below with reference to FIG. 11.

When the moving image recording mode is set, the camera controller 140 obtains the position information about the zoom lens 210 at the cycle correlated with the exposure timing of the CCD image sensor 110 (S51). At this time, the aperture value and the condition of a subject are obtained. The camera controller 140 determines whether or not the wobbling control is necessary (S52). When the wobbling control is necessary, the camera controller 140 calculates an amplitude value G based on the position information about the zoom lens 210 obtained at step S51, the aperture value and the condition of a subject (S53).

The camera controller 140 calculates a limit amplitude H as an upper limit value of the amplitude on the position of the zoom lens 210 obtained at step S51 (S54). The limit amplitude H is obtained by the following manner, for example. A magnification variation ratio I related to the obtained current position information is obtained by referring to the link information obtained at the recording preparation stage (step S17 in FIG. 7) based on the current position information about the zoom lens 210 obtained at step S51. The limit amplitude H ($\mu$m) is obtained by using the magnification variation ratio I (%) corresponding to the current zoom position and a predetermined magnification variation ratio J (%) according to the following calculating formula. The predetermined magnification variation ratio J (%) is an upper limit of the allowable magnification variation ratio in the case where the wobbling control is performed with the amplitude 80 $\mu$m.

$$H=(J/I)\times 80 \ (\mu m)$$

The camera controller 140 compares the amplitude value G calculated at step S53 with the limit amplitude H calculated at step S54. When the amplitude value G is not more than the limit amplitude H, the camera controller 140 adopts the amplitude G (S56). When the amplitude value G is more than the limit amplitude H, the camera controller 140 adopts the limit amplitude H (S57). The camera controller 140 transmits a wobbling control command including the adopted amplitude value to the interchangeable lens 200 so as to drive the focus lens 230 (S58).

With such control, the magnification variation ratio can be reduced to be not more than the predetermined value (J) regardless of the position of the zoom lens 210. When moving images are recorded, the automatic focus regulation can be suitably performed according to the state of the zoom lens 210. As a result, the variation in the magnification variation ratio of a subject image captured on the CCD image sensor 110 becomes unnoticeable.

In the second embodiment, the amplitude value in the wobbling control is calculated so that the magnification variation ratio becomes the predetermined value or less. The drive speed of the focus lens 230 in the hill climbing autofocus control may be calculated so that the magnification variation ratio becomes the predetermined value or less.

The aforementioned embodiments mainly describe the control in the recording operation of the camera system 1. However, the embodiment is not limited to the recording operation. For example, the aforementioned control may be applied to an operation in capturing a through image.

3. Correspondence of Terms

The drive mechanism 211 is one example of a zoom driver. The focus motor 233 is one example of a focus driver. The flash memory 242 is one example of a storage unit. The combination of the camera controller 140 and the body mount 150 is one example of a first obtaining unit and a transmission unit. The detector 212 is one example of a second obtaining unit. The camera controller 140 is one example of a generating unit.

Although the description has been made in connection with specified embodiments thereof, many other modifications, corrections and applications are apparent to those skilled in the art. Therefore, the present embodiment is not limited by the disclosure provided herein but limited only to the scope of the appended claims. The present disclosure relates to subject matter contained in U.S. Patent Application No. 61/160,010, filed on Mar. 13, 2009 and Japanese Patent Application No. 2009-104996, filed on Apr. 23, 2009, which are expressly incorporated herein by reference in its entirety.

INDUSTRIAL APPLICABILITY

The present embodiment can perform the suitable autofocus control according to the state of the zoom lens, and is useful for the interchangeable lens, the camera body and the camera system such as a digital still camera and a digital video camera.

What is claimed is:

1. A camera body to which an interchangeable lens is mountable, wherein:
the interchangeable lens comprises:
a zoom lens operable to change a size of a subject image;
a zoom driver operable to drive the zoom lens along an optical axis;
a focus lens operable to change a focus state of the subject image;
a focus driver operable to drive the focus lens along the optical axis; and
a storage unit operable to store link information which links position information indicating a position of the zoom lens on the optical axis with information about a variation in magnification caused by the focus lens advancing and retreating on the optical axis,
the camera body comprises:
a first obtaining unit operable to obtain the information from the interchangeable lens; and
a generating unit operable to generate a control signal, wherein when a value indicated by the information about a variation in magnification is more than a predetermined value, the control signal is generated so that an amplitude of the focus lens advancing and retreating on the optical axis or a drive speed of the focus lens in automatic focus control becomes smaller than that in a case where the value indicated by the information about a variation in magnification is less than the predetermined value.

2. The camera body according to claim 1, further comprising a second obtaining unit operable to obtain the position information about the position of the zoom lens on the optical axis in a recording operation,
wherein the generating unit refers to the information obtained by the first obtaining unit to specify information about a variation in a magnification corresponding to the position indicated by the position information obtained by the second obtaining unit, and generates the control signal based on the specified information.

3. The camera body according to claim 2, wherein the generating unit
calculates a first amplitude value of the focus lens slightly advancing and retreating on the optical axis in the automatic focus control based on the position information obtained by the second obtaining unit, and a second amplitude value of the focus lens slightly advancing and retreating on the optical axis so that a value indicated by the specified information about the variation in the magnification becomes a predetermined value or less,
generates the control signal so that the focus lens slightly advances and retreats on the optical axis with the first amplitude value, when the first amplitude value is not more than the second amplitude value, and
generates the control signal so that the focus lens slightly advances and retreats on the optical axis with the second amplitude value, when the first amplitude value is more than the second amplitude value.

4. A camera body to which an interchangeable lens is mountable, wherein:
the interchangeable lens comprises:
a focus lens operable to change a focus state of a subject image;
a focus driver operable to drive the focus lens along an optical axis; and
a storage unit operable to store information about a variation in magnification caused by the focus lens advancing and retreating on the optical axis,
the camera body comprises:
a first obtaining unit operable to obtain the information from the interchangeable lens; and
a generating unit operable to generate a control signal, wherein when a value indicated by the information about the variation in the magnification is more than a predetermined value, the generating unit generates the control signal so that an amplitude of the focus lens advancing and retreating on the optical axis or a drive speed of the focus lens in automatic focus control becomes smaller than that in a case where the value indicated by the information about the variation in the magnification is less than the predetermined value.

5. The camera body according to claim 4, wherein the generating unit
calculates a first amplitude value of the focus lens advancing and retreating on the optical axis in the automatic focus control based on the position information obtained by the second obtaining unit, and a second amplitude value of the focus lens advancing and retreating on the optical axis so that a value indicated by the specified information about the variation in the magnification becomes a predetermined value or less,
generates the control signal so that the focus lens advances and retreats on the optical axis with the first amplitude value, when the first amplitude value is not more than the second amplitude value, and
generates the control signal so that the focus lens advances and retreats on the optical axis with the second amplitude value, when the first amplitude value is more than the second amplitude value.

6. A camera system having an interchangeable lens and a camera body, wherein
the interchangeable lens includes:
a zoom lens operable to change a size of a subject image;
a zoom driver operable to drive the zoom lens along an optical axis;
a focus lens operable to change a focus state of the subject image;
a focus driver operable to drive the focus lens along the optical axis; and
a storage unit operable to store link information which links position information indicating a position of the zoom lens on the optical axis with information about a variation in magnification caused by the focus lens advancing and retreating on the optical axis,
the camera body includes:
a first obtaining unit operable to obtain the information from the interchangeable lens; and
a generating unit operable to generate a control signal, wherein when a value indicated by the information about a variation in magnification is more than a predetermined value, the control signal is generated so that an amplitude of the focus lens advancing and retreating on the optical axis or a drive speed of the focus lens in automatic focus control becomes smaller than that in a case where the value indicated by the information about a variation in magnification is less than the predetermined value.

7. A camera system including a camera body to which an interchangeable lens is mountable, wherein:
the interchangeable lens comprises:
a focus lens operable to change a focus state of a subject image;

a focus driver operable to drive the focus lens along an optical axis; and a storage unit operable to store information about a variation in magnification caused by the focus lens advancing and retreating on the optical axis the camera body comprises:

a first obtaining unit operable to obtain the information from the interchangeable lens; and a generating unit generating a control signal, wherein when a value indicated by the information about a variation in magnification is more than a predetermined value, the control signal is generated so that an amplitude of the focus lens advancing and retreating on the optical axis or a drive speed of the focus lens in automatic focus control becomes smaller than that in a case where the value indicated by the information about a variation in magnification is less than the predetermined value.

* * * * *